United States Patent Office 3,453,840
Patented July 8, 1969

3,453,840
TUBE-WITHIN-A-TUBE TYPE
HEAT EXCHANGERS
Akira Nagakura, Tochigi, and Koichi Iyoshi, Tomio Kuribara, and Yoshimi Ishiwara, Gunma, Japan, assignors to Sanyo Electric Co., Ltd., Osaka, Japan, and Tokyo Sanyo Electric Co., Ltd., Gunma, Japan, both corporations of Japan
Filed June 30, 1967, Ser. No. 650,346
Claims priority, application Japan, July 2, 1966, 41/43,151
Int. Cl. F25b 13/00; F28d 7/14
U.S. Cl. 62—324                                   8 Claims

ABSTRACT OF THE DISCLOSURE

A tube-within-a-tube type heat exchanger in which the inner tube through which the second heat exchange medium is circulated is eccentrically arranged within the outer tube through which the first heat exchange medium is circulated, whereby the effectiveness of heat exchange is increased on either the heating or cooling cycle.

---

This invention relates to certain new and useful improvements in tube-within-a-tube type heat exchangers comprising an outer tube and an inner tube placed in the outer tube so that heat exchange is effected between the first heat exchange medium flowing through the space between the outer and inner tubes and the second heat exchange medium flowing through the inner tube, and it particularly relates to such heat exchangers which are adapted for utilization in heating units as well as in cooling units, as of the type of home air conditioning units, for the purpose of cooling and heating the refrigerant to provide for its recirculation through the system.

There are known two types of heat exchangers which are adapted for utilization in air conditioning units. One is the shell-and-tube type and the other is the tube-within-a-tube type. These two types have their respective advantages and disadvantages.

The shell-and-tube type heat exchanger comprises a relatively large shell or cabinet which reserves the first heat exchange medium of a liquid state such as monochlorodifluoromethane known as Refrigerant-22 or R-22 and the tube coil through which the second heat exchange medium such as water is circulated, for example as shown in U.S. patent specification No. 2,272,083. The tube coil is dipped in the first heat exchange medium within the shell so that heat exchange is effectively carried out between the first heat exchange medium of a liquid state having a relatively low temperature and the second heat exchange medium to rapidly evaporate the first heat exchange medium. The shell and tube type heat exchanger, therefore, find its usefulness as an evaporator having a good efficiency. This heat exchanger is, however, little useful as a condenser because it is required to take off the liquidized first heat exchange medium from the heat exchanger as quickly as possible in order to keep the tube coil in contact with the gaseous first heat exchange medium within the shell. In addition, the provision of a liquid receiver having a large capacity will become necessary for reserving the liquidized heat exchange medium discharged from the shell.

To the contrary, the tube-within-a-tube type heat exchanger is very useful as a condenser because the first heat exchange medium, if liquidized, is not retained in the heat exchanger but flows out immediately therefrom and, accordingly, no liquid receiver is required or, if required, it may be of a small capacity. The effectiveness of heat exchange is very high as the inner tube through which the second heat medium such as water is circulated is always in contact with the first heat exchange medium of a vapor state within the outer tube due to the fact that the liquified first heat exchange medium flows out immediately from the heat exchanger. Another great advantage with the tube-within-a-tube type heat exchanger is the fact that there is not required such a large quantity of the first heat exchange medium as required with the shell and tube type heat exchanger to dip the tube coil in the first heat exchange medium within the shell. When the tube-within-a-tube type heat exchanger is used as an evaporator, it is not, however, so effective as in case of a condenser because the difference in temperature between the first and the second heat exchange medium is relatively small when it is used as an evaporator while the same is relatively large when it is used as a condenser in addition to the fact that the inner tube through which the second heat exchange medium flows is in contact with the refrigerant in the form of a mixture of gas and liquid while with the shell-and-tube type heat exchanger the tube is placed entirely within the liquefied first heat exchange medium.

In a reversible cycle type air conditioner wherein the direction of flow of the refrigerant, i.e. the first heat exchange medium is changed from either one to each other to make shift between cooling and heating operations, the difference in temperature between the first and second heat exchange mediums on the heating cycle is less than on the cooling cycle so that the effectiveness of heat exchange, i.e. the effect of heating is lowered. Therefore, in designing a reversible cycle type air conditioner, the heating cycle is taken as the basis of design. However, since the tube-within-a-tube type heat exchanger suffers a great difference between the heat exchanged on the cooling cycle and that on the heating cycle, it is seldom used for the reversible cycle. In the shell-and-tube type heat exchanger, the internally positioned tube is almost completely immersed in a liquid refrigerant, so that the difference in heat exchange is relatively small. Therefore, in reversible cycle type air conditioners, use is made mainly of this shell-and-tube type heat exchanger. However, so far as it is used solely for the cooling cycle, the tube-within-a-tube type heat exchanger has a higher efficiency of heat exchange and is easier to produce than the shell-and-tube type heat exchanger. Thus the development of a tube-within-a-tube type heat exchanger which has a less difference in heat exchange between cooling and heating work times has heretofore been desired.

It is, therefore, the principal object of the invention to provide a tube-within-a-tube type heat exchanger which is adapted for utilization in reversible cycle type air conditioning units.

Another object of the invention is to provide a tube-within-a-tube type heat exchanger which can be operated both for the heating cycle and for the cooling cycle, in which there is little difference between the heat exchanged on the heating cycle and that on the cooling cycle.

A further object of the invention is to provide a tube-within-a-tube type heat exchanger which is particularly adapted for utilization in air conditioning units, especially for air cooling, in which the heat exchanged on the cooling cycle is carried out with such a high efficiency as never has been obtained with the conventional type.

According to the invention an outer tube through which the first heat exchange medium is circulated extends substantially horizontally and an inner tube through which the second heat exchanger medium is circulated extends through the outer tube and is eccentrically arranged with respect to the outer tube. The direction of the eccentricity is either upwardly or downwardly and depends on the cycle on which the system is to be operated, namely, the heating cycle or the cooling cycle.

For utilization in air conditioning units for heating and cooling use, the inner tube through which the second heat exchange medium is circulated is downwardly eccentrically within the outer tube through which the first heat exchange medium is circulated, whereby with the inner tube being submerged in the liquid first heat exchange medium within the outer tube the effectiveness of the heat exchange on the heating cycle is remarkably increased so that there is little difference between the heat exchanged on the heating cycle and that on the cooling cycle.

In order to keep the inner tube in closer contact with the first heat exchange medium of a liquid state, it is recommendable that the inner tube is provided at its outer surface with fins which are preferably of such type that the entire exposed surface of the inner tube may be wetter by the first heat exchange medium owing to the capillary action of the fins.

In case where the tube-within-a-tube type heat exchanger is solely used as a condenser for utilization in air conditioning units for air cooling or similar cooling units, the effectiveness of heat exchange can be increased by arranging the inner tube upwardly eccentrically within the outer tube so as to keep the inner tube in contact as much as possible with the first heat exchange medium of a vapor state.

The other objects and advantages of the invention will become apparent from the following description with reference to the accompanying drawings, in which.

Figure 1:
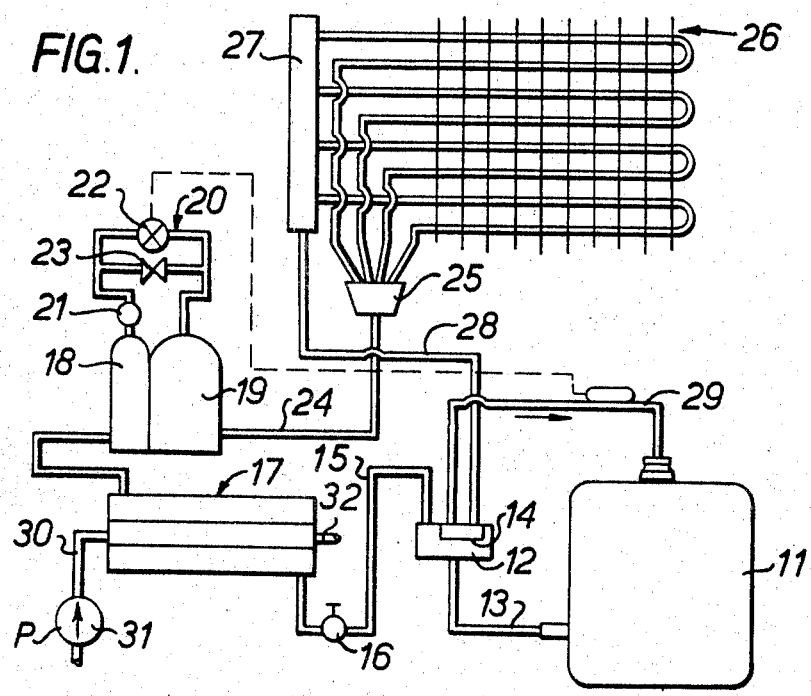
FIG. 1 is a refrigerant circuit diagram for a reversible cycle type air conditioner provided with a heat exchanger according to the invention.

Referring to the drawings, particularly to FIG. 1, an electric motor-driven compressor 11 for compressing a first heat exchange medium such as a refrigerant is conected to a four-way valve 12 through a discharge tube 13. One of the most typical refrigerant is monochlorodifluoromethane $CHClF_2$ known as R–22. The four-way valve 12 may be of any known type. By way of example, it is internally provided with a sliding plate 14 which serves as a switching element for changing the direction of flow of the refrigerant according to the cooling and heating cycles, respectively. A tube 15 extending from the four-way valve 14 is connected through a service valve 16 to the first heat exchanger 17 which is in turn connected to the first liquid receiver 18. The first liquid receiver is communicated with the second liquid receiver 19 through a connection passage 20 including a service valve 21 and an expansion valve 22. A throttle valve 23 is also inserted in the connection passage 20 so as to be connected in parallel with the expansion valve 22.

In the state shown in FIG. 1, the four-way valve 12 communicates the tube 13 with the tube 15, and, the tube 28 with the tube 29, respectively. This shows that the system is operating on the cooling cycle. It will be appreciated that on the heating cycle the four-way valve 12 is switched so as to communicate the tube 13 with the tube 28, and, the tube 15 with the tube 29, respectively.

The reference numeral 30 indicates a pipe or tube for supplying the second heat exchange medium such as water and the reference numeral 31 indicates a water supply pump. The second heat exchange medium supplied by the pump 31 enters through the pipe 30 into the first heat exchanger 17 for heat exchange with the first heat exchange medium introduced into the heat exchanger 17 and is then discharged therefrom. The reference numeral 32 indicates the discharge pipe. The flow rate through the throttle valve 23 is always corresponding to the minimum load state and any change in the flow rate of the first heat exchange medium in the whole system according to variation of the load is effected by controlling the expansion valve 22. The second liquid receiver 19 is larger than the first liquid receiver 18 whereby any excess amount of the first heat exchange medium can be reserved therein on the heating cycle. A tube 24 extending from the second liquid receiver 19 is connected through a distributor 25 to the second heat exchanger, generally indicated as 26, which is for room cooling and heating use. The header 27 of the second heat exchanger 26 is then connected by a connecting tube 28 to the four-way valve 12. Another tube 29 extending from the four-way valve is connected to the compressor 11 at its suction side.

Figure 2:
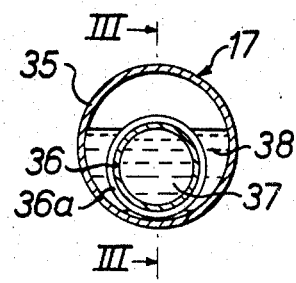
FIG. 2 is a cross-section of a tube-within-a-tube type heat exchanger showing an embodiment of the invention.
Figure 3:
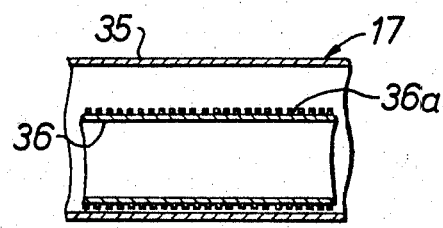
FIG. 3 is longitudinally sectional view of the heat exchanger, partly cut off and taken along the line III—III of FIG. 2.

The first heat exchanger 17 is a tube-within-a-tube type heat exchanger which comprises an outer tube 35 and a finned inner tube 36 mounted therein so as to extend along and abut against the lowest portion of the inner wall of the outer tube 35, as shown in FIGS. 2 and 3. The reference numeral 36a indicates the fins with which the inner tube 36 is provided. The second heat exchange medium 37 is circulated through the inner tube 36 while the first heat exchange medium 38 is circulated through the space between the outer and inner tubes 35 and 36. The first heat exchanger 17 is so installed that the first and second heat exchange mediums 38 and 37 may flow substantially horizontally. The two tubes 35 and 36 are, therefore, arranged substantially horizontally.

According to the invention, the inner tube 36 is mounted so as to be downwardly eccentrically positioned along the lowest portion of the inner wall of the outer tube 35, the first heat exchange medium 38 liquefied on the heating cycle covers the inner tube 36 almost completely and the effectiveness of heat exchange between it and the second heat exchange medium 37 flowing through the inner tube 36 is increased, whereby the first heat exchange medium 38 is quickly gasified and returned to the electric motor-driven compressor 11. On the other hand, on the cooling cycle, the first heat exchange medium 38 in the form of a hot gas flows into the space between the outer and inner tubes 35 and 36 and is cooled and liquefied by the second heat exchange medium 37 flowing through the inner tube 36. At this time, since the inner tube 36 is downwardly eccentric with respect to the axis of the outer tube 35, the area of contact between the first heat exchange medium 38 in the form of hot gas and the inner tube 36 at a region nearer to the discharge end of the first heat exchanger 17 becomes small and hence the effect of cooling is somewhat lowered. However, the difference in the heat exchanged on the cooling cycle and that on the heating cycle becomes small as compared with the conventional tube-within-a-tube type heat exchanger in which the outer and inner tubes are concentrically positioned, so that the present heat exchanger can be used as a heat exchanger for reversible cycle type air conditioners. Although a plain tube may be used as the inner tube 36, the inner tube is preferably formed in a finned shape to increase the heat exchange area. When R–22 is used as the first heat exchange medium 38, if the fin distance is selected to be within the range of 0.1 mm.–0.5 mm. capillarity will occur, whereby the first heat exchange medium 38 of a liquid state is sucked up in each clearance between adjacent fins to wet the entire outer surface of the inner tube 36 with the liquid to be evaporated therefrom, so that the heat which is exchanged can be greatly increased. Further, similar merits can also be achieved by using a spine-fin tube for the inner tube 36.

Figure 4:
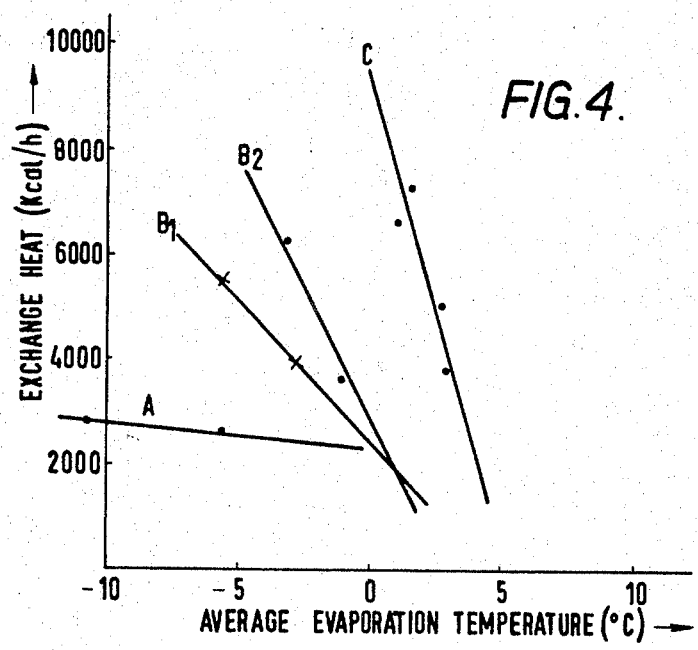
FIG. 4 is a graph showing the results of a comparison test between a conventional tube-within-a-tube type heat exchanger and the present tube-within-a-tube type heat exchanger.

FIG. 4 shows the results of testing the present heat exchanger utilized as an evaporator, using a 31.8 mm. outer diameter x 28.6 mm. inner diameter x 7200 mm. length linear steel tube as the outer tube 35 and a finned tube of deoxidized cuprum having 19 fins per 25.4 mm. as the inner tube 36, the outer diameter of the finned tube being 22.2 mm., the inner diameter being 16.8 mm., the groove diameter being 19.1 mm., the specification of the electric motor-driven compressor being that the refrigerating capacity is 10,200 kcal./h. at the evaporation temperature of 7.2° C. and the condensation temperautre 54.5° C., R–22 being used as the first heat exchange medium 38 and water as the second heat exchange medium 37, the temperatures of the water being maintained at constant values, e.g. 15.5° C. at inlet and 7° C. at outlet, the heat exchange being determined by any change in the quantity of flow of water. In the graph, a line A indicated with the reference character refers to a heat exchanger in which the outer and inner tubes 35 and 36 are concentrically retained, and lines $B_1$ and $B_2$ refer to instances in which the inner tube 36 is merely placed in the outer tube 35 without considering the concentricity of arrangement. In the latter case, there will be variations of performance caused by the carrying positions of the inner tube 36, but it is inferred that the heat exchanged will be increased as compared with the results of the A since the inner tube 36 tends to be positioned at a level somewhat below the axis of the outer tube 35 because of the self-weight of the inner tube 36. A line C refers to the present heat exchanger in which the inner tube 36 is pressed against the lowest portion of the inner wall of the outer tube 35 by means of a spacer.

Figure 5:
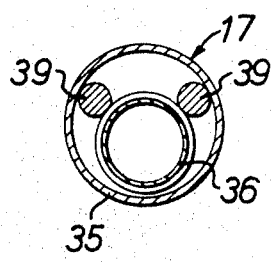
FIGS. 5 to 10 are cross sections of heat exchangers showing various embodiments of the invention.
Figure 6:
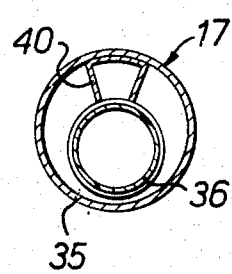
Figure 7:
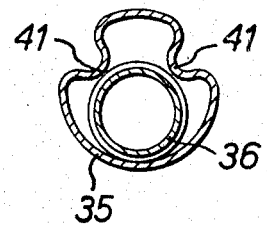
Figure 8:
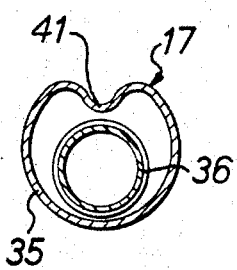

FIGS. 5 to 8 illustrate some other embodiments of the invention. The same reference numerals indicate like parts throughout the drawings. In FIG. 5, as spacer means inserted between the outer and inner tubes 35 and 36, use is made of steel wires 39 welded to the inner tube 36 placed in the outer tube 35. In FIG. 6, a spacer 40 made of synthetic resin is placed between the outer tube 35 and the top of the inner tube 36. In the embodiments illustrated in FIGS. 7 and 8, the outer tube 35 is not of a circular section but deformed so as to have at least one inwardly projected portion 41 at which the inner tube 36 is inscribed. These two embodiments are advantageous in that the provision of any particular spacer is not necessitated.

Figure 9:
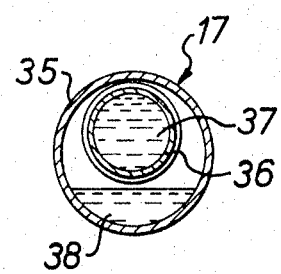
Figure 10:
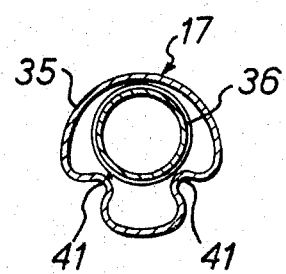

So far, the description has been directed to a heat exchanger used for reversible cycle type air conditioners. On the other hand, in case that it is used as a condenser exclusively for the cooling cycle such as in cooling-purpose air conditioners and refrigerating showcases, the inner tube 36 should be mounted at the highest portion of the inner wall of the outer tube 35, as shown in FIGS. 9 to 10. The first heat exchange medium in the form of a hot gas discharged from the electric motor-driven compressor 11 (FIG. 1) flows into the space between the outer and inner tubes 35 and 36, where it is cooled by the second heat exchange medium such as water flowing through the inner tube 36 and is thereby liquidized to flow along the lower portion of the outer tube 35. Thus, since the liquidized first heat exchange medium flows without contacting the inner tube 36, the viscosity resistance is low, and since the major part of the inner tube 36 is surrounded with the first heat exchange medium which is not yet liquidized, the effectiveness of heat exchange is increased, thus making it possible to provide a condenser having a higher efficiency. As an example thereof, inwardly projected portions 41 may be provided in the lower portion of the outer tube 35 as shown in FIG. 10, or a spacer may be utilized.

As mentioned above, where the inner tube 36 is placed in the outer tube 35 so as to be downwardly eccentrically positioned, the heat exchanger can be used for reversible cycle type air conditioners, and where the inner tube 36 is upwardly eccentrically placed in the outer tube 35, the heat exchanger can be efficiently used as a condenser for cooling cycle such as in cooling-purpose air conditioners and refrigerating showcases.

What we claim is:

1. Air conditioning apparatus, comprising in combination: a motor-driven compressor, a first tube-within-a-tube type heat exchanger communicating with said compressor, a second heat exchanger communicating with the compressor, conduit means interconnecting said compressor and said first and second heat exchangers, a first heat exchange medium supplied by the compressor to the conduit means, valve means for directing the flow of the first heat exchange medium either to said first heat exchanger or to the second heat exchanger, and a second heat exchange medium communicating with said first heat exchanger, said first heat exchanger comprising an outer tube for circulating said first heat exchange medium therethrough, said outer tube extending substantially horizontally, and an inner tube for circulating said second heat exchange medium therethrough, said inner tube extending eccentrically through lowermost portions of said outer tube, said inner tube being maintained in said eccentrically extending position by at least one deformed portion of said outer tube.

2. Air conditioning apparatus as defined in claim 1, wherein said outer tube is formed with a cross sectional shape with a pair of inwardly projected portions below which said inner tube is positioned along lowermost portions of the inner wall of said outer tube.

3. Air conditioning apparatus as defined in claim 1, further comprising fins disposed at the outer surface of said inner tube, said fins being arranged in spaced relationship such that capillary action may occur along adjoining fins thereby enabling the entire outer surface of said inner tube to be wetted with the first heat exchange medium of a liquid state before being evaporated therefrom.

4. Air conditioning apparatus as defined in claim 3, wherein said fins extend radially from the inner tube along the length of the outer tube.

5. A tube-within-a-tube type heat exchanger for use with reversible cycle type air conditioning units, comprising an outer tube for circulating a first heat exchange medium therethrough, said outer tube extending substantially horizontally, and an inner tube for circulating a second heat exchange medium therethrough, said inner tube extending through said outer tube downwardly and eccentrically with respect to the axis of said outer tube, said inner tube being maintained in said eccentrically extending position by deformed portions of said outer tube.

6. A tube-within-a-tube type heat exchanger as defined in claim 5, wherein said outer tube is formed with a cross sectional shape with a pair of inwardly projected portions below which said inner tube is positioned along lowermost portions of the inner wall of said outer tube.

7. A tube-within-a-tube type heat exchanger as defined in claim 5, further comprising fins disposed at the outer surface of said inner tube, said fins being arranged in spaced relationship such that capillary action may occur along adjoining fins thereby enabling the entire outer surface of said inner tube to be wetted with the first heat exchange medium of a liquid state before being evaporated therefrom.

8. A tube-within-a-tube type heat exchanger as defined in claim 7, wherein said fins extend radially from the inner tube along the length of the outer tube.

References Cited

UNITED STATES PATENTS

| 1,761,281 | 6/1930 | Taub | 165—154 X |
| 2,259,433 | 10/1941 | Kitto | 165—154 |
| 2,513,373 | 7/1950 | Sporn | 62—160 |
| 2,590,465 | 3/1952 | Ris | 165—143 |
| 3,307,368 | 3/1967 | Harnish | 62—160 |

WILLIAM J. WYE, *Primary Examiner.*

U.S. Cl. X.R.

62—515; 165—154, 164